US011235412B2

(12) United States Patent
Radighieri

(10) Patent No.: US 11,235,412 B2
(45) Date of Patent: Feb. 1, 2022

(54) WELDING TOOL

(71) Applicant: Trinity Central Maintenance, LLC, Dallas, TX (US)

(72) Inventor: Greg Alan Radighieri, Sunnyvale, TX (US)

(73) Assignee: TRINITY CENTRAL MAINTENANCE, LLC, Dallas, TX (US)

( * ) Notice: Subject to any disclaimer, the term of this patent is extended or adjusted under 35 U.S.C. 154(b) by 543 days.

(21) Appl. No.: 16/263,556

(22) Filed: Jan. 31, 2019

(65) Prior Publication Data

US 2020/0246903 A1  Aug. 6, 2020

(51) Int. Cl.
  *B23K 9/12* (2006.01)
  *B23K 9/095* (2006.01)
  *B23K 26/042* (2014.01)
  *B23K 9/127* (2006.01)

(52) U.S. Cl.
  CPC .......... *B23K 9/0956* (2013.01); *B23K 9/1274* (2013.01); *B23K 26/042* (2015.10); *B23K 9/126* (2013.01)

(58) Field of Classification Search
  CPC . B23K 9/00; B23K 9/042; B23K 9/09; B23K 9/0956; B23K 9/12; B23K 9/126; B23K 9/127; G05B 19/00; G05B 19/04; G05B 19/18; G05B 19/184
  See application file for complete search history.

(56) References Cited

U.S. PATENT DOCUMENTS

| 5,465,037 | A | * | 11/1995 | Huissoon | ............ B05C 11/1021 318/568.11 |
| 5,572,102 | A | * | 11/1996 | Goodfellow | ........... B25J 9/1697 219/124.1 |
| 6,040,550 | A | * | 3/2000 | Chang | .................. B23K 26/032 219/121.63 |

(Continued)

FOREIGN PATENT DOCUMENTS

CN        107020449 A      8/2017

OTHER PUBLICATIONS

International Search Report and Written Opinion for PCT Patent Application No. PCT/US2020/015093, dated May 11, 2020; 13 pages.

(Continued)

*Primary Examiner* — Robert J Utama
*Assistant Examiner* — Ayub A Maye
(74) *Attorney, Agent, or Firm* — Baker Botts L.L.P.

(57) ABSTRACT

An apparatus includes a welding torch, a laser capable of projecting a beam towards a seam on a surface, a camera directed towards the surface, a memory, and a processor. The processor receives an image of the surface from the camera. Next, the processor determines, based on the reflection of the laser beam from the surface, a vertical distance from the torch to the seam. The processor adjusts the brightness and contrast of the image, applies a gamma correction, and applies at least one gradient filter to the image to produce a new image. Next, the processor determines a horizontal location of the seam in the new image, which it uses to determine a horizontal distance from the torch to the seam. Based on the vertical and horizontal distances from the torch to the seam, the processor adjusts a vertical and a horizontal position of the torch.

20 Claims, 8 Drawing Sheets

(56) References Cited

U.S. PATENT DOCUMENTS

| | | | | |
|---|---|---|---|---|
| 6,078,021 | A * | 6/2000 | Chang | B23K 26/0823 |
| | | | | 219/121.63 |
| 10,913,125 | B2 * | 2/2021 | Meess | A61F 9/06 |
| 2012/0305532 | A1 * | 12/2012 | Harris | B23K 9/1735 |
| | | | | 219/76.14 |
| 2017/0057000 | A1 * | 3/2017 | Hsu | B23K 9/12 |

OTHER PUBLICATIONS

International Report on Patentability for PCT Patent Application No. PCT/US2020/015093, dated Aug. 12, 2021; 8 pages.

\* cited by examiner

| 0 | 1 | 1 | 1 | 1 | 0 |
|---|---|---|---|---|---|
| 1 | 2 | 2 | 2 | 2 | 1 |
| 1 | 2 | 3 | 3 | 2 | 1 |
| 0 | 0 | 0 | 1 | 0 | 0 |
| 1 | 2 | 3 | 3 | 2 | 1 |
| 1 | 2 | 2 | 2 | 2 | 1 |
| 0 | 1 | 1 | 1 | 1 | 0 |

515:

| 1 | 1 | 1 |
|---|---|---|
| 0 | 0 | 0 |
| 1 | 1 | 1 |

505:

| 0 | 1 | 1 | 1 | 1 | 1 |
|---|---|---|---|---|---|
| 1 | 2 | 2 | 2 | 2 | 1 |
| 1 | 2 | 3 | 3 | 2 | 1 |
| 0 | 0 | 0 | 0 | 0 | 0 |
| 1 | 2 | 3 | 3 | 2 | 1 |
| 1 | 2 | 2 | 2 | 2 | 1 |
| 0 | 1 | 1 | 1 | 1 | 0 |

WELDING TOOL

TECHNICAL FIELD

This disclosure relates generally to welding systems.

BACKGROUND

Automatically guided welding systems are well known in the manufacturing industries. By employing a system to automatically guide a welding torch along a joint or seam in a workpiece, companies are able to avoid the time and costs associated with the labor-intensive process of manually locating and following such seams.

SUMMARY OF THE DISCLOSURE

Automatically guided welding systems are well known in the manufacturing industries. By employing a system to automatically guide a welding torch along a joint or seam in a workpiece, companies are able to avoid the time and costs associated with the labor-intensive process of manually locating and following such seams. Automatically guided systems typically use some type of seam locating tool. Commonly, a laser line and camera are used for this purpose; a laser line is projected at an angle across the workpiece surface, including the seam, and the reflection is viewed with a camera. The resulting deformation of the reflection—occurring due to the presence of the seam geometry—is used to determine the horizontal location of the seam, while the reflection itself is used to determine the vertical distance to the seam. This method works well for groove welds and welds with a defined seam geometry, but fails for tight butt seams. This is because an insufficient surface groove or other seam geometry is present in tight butt seams to deform the reflection of the laser line such that it is viewable or detectable by the camera.

This disclosure contemplates an unconventional welding tool that addresses one or more of the above issues. The welding tool uses both a laser line and an image processor to determine the location of a tight butt seam relative to the welding torch head. The tool first projects a laser line across a seam in a workpiece. A camera then captures the reflection of the laser line, along with light reflected from the seam. The reflection of the laser line is used to determine the vertical distance from the welding torch head to the seam in the workpiece. The image captured by the camera is processed to enhance the intensity of the light reflected from the seam. Subsequently, a line tracking algorithm is used on the enhanced image to determine the horizontal location of the seam. Using the vertical and horizontal distances from the torch head to the seam, an adjustment mechanism is then used to automatically adjust the location of the torch head such that welding of the seam can occur. Certain embodiments of the welding tool are described below.

According to one embodiment, an apparatus includes a welding torch, a laser beam source, a camera, a memory, and a hardware processor communicatively coupled to the memory and the camera. The welding torch includes a torch head. The laser beam source is able to project a laser beam generally towards a seam on a surface. The camera is directed towards the surface and is able to capture an image that includes the surface and a reflection of the laser beam from the surface. The memory stores a gamma correction, a brightness value, a contrast value, and at least one gradient filter. The hardware processor receives the image from the camera. Next, the processor determines, based on the reflection of the laser beam from the surface, a vertical distance from the torch head to the seam. The processor then adjusts a brightness of the image, based on the brightness value, adjusts a contrast of the image, based on the contrast value, and applies the gamma correction to the image. The processor further applies at least one gradient filter to the image to produce a new image. Next, the processor determines a horizontal location of a line in the new image, where the line in the new image corresponds to the seam. The processor then determines, based on the horizontal location of the line in the new image, a horizontal distance from the torch head to the seam. Based on the vertical distance from the torch head to the seam, the processor then adjusts a vertical position of the torch head. Based on the horizontal distance from the torch head to the seam, the processor further adjusts a horizontal position of the torch head.

According to another embodiment, a method includes receiving an image from a camera. The image includes a surface and a reflection of a laser beam directed generally towards a seam on the surface. The method also includes determining, based on the reflection of the laser beam from the surface, a vertical distance from a welding torch head to the seam. The method further includes adjusting a brightness of the image, adjusting a contrast of the image, applying a gamma correction to the image, and applying at least one gradient filter to the image to produce a new image. The method further includes determining a horizontal location of a line in the new image. The line in the new image corresponds to the seam. The method additionally includes determining, based on the horizontal location of the line in the new image, a horizontal distance from the welding torch head to the seam. The method also includes adjusting a vertical position of the welding torch head based on the vertical distance from the welding torch head to the seam. The method further includes adjusting a horizontal position of the welding torch head based on the horizontal distance from the welding torch head to the seam.

According to a further embodiment a system includes a welding torch, a laser beam source, a camera, a storage element, and a processing element communicatively coupled to the storage element and the camera. The welding torch includes a torch head. The laser beam source is able to project a laser beam generally towards a seam on a surface. The camera is directed towards the surface and is able to capture an image that includes the surface and a reflection of the laser beam from the surface. The storage element is operable to store a gamma correction, a brightness value, a contrast value, and at least one gradient filter, including a first filter that is used to extract a west edge of a brighter region in the image. The processing element is operable to receive the image from the camera. The processing element is further operable to determine, based on the reflection of the laser beam from the surface, a vertical distance from the torch head to the seam. The processing element is also operable to adjust a brightness of the image, based on the brightness value, adjust a contrast of the image, based on the contrast value, apply the gamma correction to the image, and apply the at least one gradient filter to the image to produce a new image. The processing element is further operable to determine a horizontal location of a line in the new image, where the line in the new image corresponds to the seam. The processing element is also operable to determine, based on the horizontal location of the line in the new image, a horizontal distance from the torch head to the seam. Additionally, the processing element is operable to adjust a vertical position of the torch head, based on the vertical distance from the torch head to the seam. Finally, the processing element is further operable to adjust a horizontal position of the torch head, based on the horizontal distance from the torch head to the seam.

Certain embodiments provide one or more technical advantages. For example, an embodiment enables manufacturers to frequently and reliably employ tight butt seams, a basic type of seam, for their welds. As another example, an embodiment reduces the time and cost associated with both welding and gouging tight butt seams, which would otherwise require manual tracking of the seam locations. As a further example, an embodiment enables the use of laser seam tracking to provide high quality welds despite horizontal irregularities in workpieces, such that at certain locations along an otherwise grooved/spaced seam the gap between the workpieces disappears. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIG. 5 illustrates examples of gradient filters used by the image processor of the welding system of FIG. 1;

DETAILED DESCRIPTION

Embodiments of the present disclosure and its advantages are best understood by referring to FIGS. 1 through 8 of the drawings, like numerals being used for like and corresponding parts of the various drawings.

Automatically guided welding systems are well known in the manufacturing industries. By employing a system to automatically guide a welding torch along a joint or seam in a workpiece, companies are able to avoid the time and costs associated with the labor-intensive process of manually locating and following such seams. Automatically guided systems typically use some type of seam locating tool. Commonly, a laser line and camera are used for this purpose; a laser line is projected at an angle across the workpiece surface, including the seam, and the reflection is viewed with a camera. The resulting deformation of the reflection—occurring due to the presence of the seam geometry—is used to determine the horizontal location of the seam, while the reflection itself is used to determine the vertical distance to the seam. This method works well for groove welds and welds with a defined seam geometry but fails for tight butt seams. This is because an insufficient surface groove or other seam geometry is present in tight butt seams to deform the reflection of the laser line such that is viewable or detectable by the camera.

This disclosure contemplates an unconventional welding tool that addresses one or more of the above issues. The welding tool uses both a laser line and an image processor to determine the location of a tight butt seam relative to the welding torch head. The welding tool first projects a laser line across a seam in a workpiece. A camera then captures the reflection of the laser line, along with light reflected from the seam. The reflection of the laser line is used to determine the vertical distance from the welding torch head to the seam in the workpiece. The image captured by the camera is processed to enhance the intensity of the light reflected from the seam. Subsequently, a line tracking algorithm is used on the enhanced image to determine the horizontal location of the seam. Using the vertical and horizontal distances from the torch head to the seam, an adjustment mechanism is then used to automatically adjust the location of the torch head such that welding of the seam can occur. By performing image processing to enhance the image of the seam collected by the camera, the welding tool can automatically locate and weld/gouge tight butt seams, a process that would otherwise require manual positioning of the welder torch. The welding tool will be described in more detail using FIGS. 1 through 8.

Figure 1:
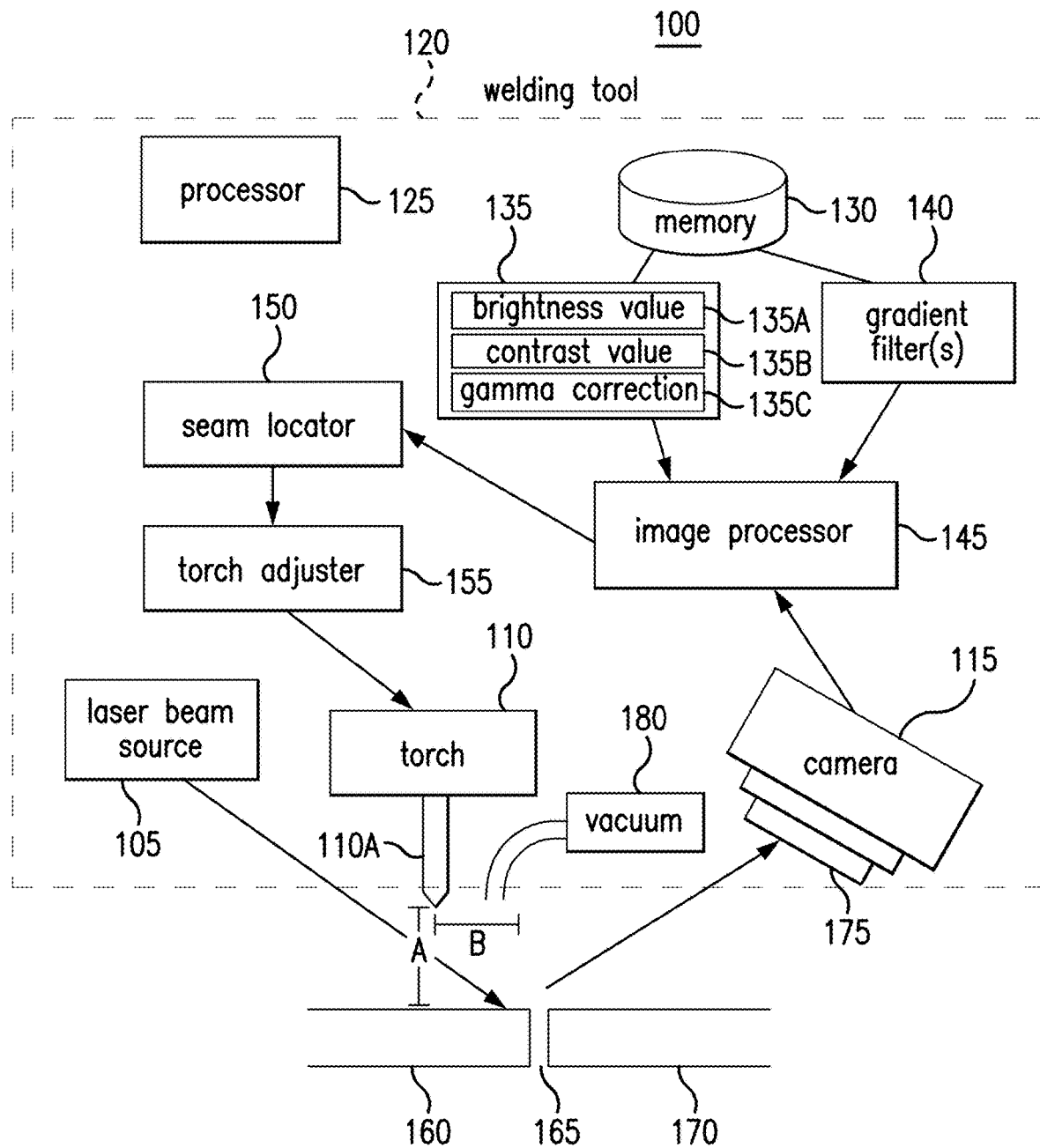
FIG. 1 illustrates an example welding system.

FIG. 1 illustrates an example welding system 100. As seen in FIG. 1, system 100 includes first workpiece 160, second workpiece 170, seam 165, and welding tool 120. First workpiece 160 and second workpiece 170 are two pieces of material that a user of welding tool 120 can weld together at seam 165. Generally, welding tool 120 is able to automatically determine the location of seam 165 by directing a laser beam line from laser beam source 105 onto first workpiece 160, second workpiece 170, and across seam 165, and detecting an image of both the laser line and surrounding areas (including seam 165) of first workpiece 160 and second workpiece 170 with camera 115. Here, the reflection of the laser beam line produced by laser source 105 is used to determine the vertical distance A from the torch head 110A of welding torch 110 to seam 165. In order to determine the horizontal distance B from the torch head 110A to seam 165, the image gathered by camera 115 is processed using image processor 145 to enhance the intensity of the light reflected by seam 165. Vertical distance A and horizontal distance B are then used to automatically adjust the position of torch head 110A using torch adjuster 155 such that seam 165 can be welded by welding tool 120. In this manner, welding tool 120 can be used to weld or gouge a wide variety of seams 165, including tight butt seams 165, with a separation between first workpiece 160 and second workpiece 170 that is too small for traditional automatically guided welders to detect.

As can be seen in FIG. 1, welding tool 120 includes processor 125, memory 130, laser beam source 105, torch 110, torch head 110A, and camera 115. This disclosure contemplates processor 125 and memory 130 being configured to perform any of the functions of welding tool 120 described herein. Generally, welding tool 120 implements an image processor 145 to enhance the intensity of the light reflected by seam 165 and captured by camera 115, a seam locator 150 to determine the horizontal position B and vertical position A of seam 165 relative to torch head 110A, and torch adjuster 155 to adjust to the position of torch head 110A based on the horizontal distance B and vertical distance A of torch head 110A to seam 165. Additionally, welding tool 120 stores brightness values 135A, contrast values 135B, gamma correction 135C, and one or more gradient filters 140 that are used by image processor 145, in memory 130.

Processor 125 is any electronic circuitry, including, but not limited to microprocessors, application specific integrated circuits (ASIC), application specific instruction set processor (ASIP), and/or state machines, that communicatively couples to memory 130 and controls the operation of welding tool 120. Processor 125 may be 8-bit, 16-bit, 32-bit, 64-bit or of any other suitable architecture. Processor 125 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 125 may include other hardware and software that operates to control and process information. Processor 125 executes software stored on memory to perform any of the functions described herein. Processor 125 controls the operation and administration of welding tool 120 by processing information received from camera 115 and memory 130. Processor 125 may be a programmable logic device, a microcontroller, a microprocessor, any suitable processing device, or any suitable combination of the preceding. Processor 125 is not limited to a single processing device and may encompass multiple processing devices.

Memory 130 may store, either permanently or temporarily, data, operational software, or other information for processor 125. Memory 130 may include any one or a combination of volatile or non-volatile local or remote devices suitable for storing information. For example, memory 130 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 130, a disk, a CD, or a flash drive. In particular embodiments, the software may include an application executable by processor 125 to perform one or more of the functions described herein.

Memory 130 also stores brightness values 135A, contrast values 135B, and gamma corrections 135C, as well as one or more gradient filters 140. These values are used by image processor 145 to adjust the image received from camera 115 in order to accentuate seam line 165 by enhancing the intensity of the light reflected by seam 165 and captured by camera 115. Seam locator 150 then takes the adjusted image created by image processor 145 and uses this adjusted image to locate the horizontal location of seam 165 in the enhanced image.

Laser beam source 105 is used to produce a monochromatic beam of light that is projected onto first workpiece 160, second workpiece 170 and across seam 165, at a location in front of torch head 110A. In certain embodiments, laser beam source 105 produces a laser beam line that is projected onto first workpiece 160, second workpiece 170, and across seam 165. In certain other embodiments, laser beam source 105 produces a spot that laser beam source 105 then sweeps across first workpiece 160, second workpiece 170, and seam 165.

Camera 115 is directed towards first workpiece 160, second workpiece 170, and seam 165, and is used to capture an image of the reflection of the laser beam produced by laser beam source 105, along with light reflected by seam 165. Camera 115 stores this image as a digital data stream including a set of pixels of varying intensities. In certain embodiments, camera 115 is focused by an auto-focusing device. This helps to ensure a sharp image, which can be used to accurately determine the horizontal location of seam 165 during the welding process.

In certain embodiments, a filter 175 may be attached to camera 115. In particular embodiments, filter 175 may be used to remove glare produced by torch 110. This may be desirable to help increase the contrast between first workpiece 160, second workpiece 170, and seam 165 in the image gathered by camera 115. In further embodiments, filter 175 may be a bandpass filter used to allow only the monochromatic light produced by laser beam source 105 into camera 115.

A vacuum system 180 may also be present, in certain embodiments, to remove any smoke that may be produced in the welding process that may otherwise obscure the image of seam 165. Such a vacuum system 180 may include one or more hoses, or any other device suitable to remove smoke from the area surrounding the weld.

Torch 110, including torch head 110A, is used to perform the welding or gouging operation. Torch 110 is suspended above first workpiece 160, second workpiece 170, and seam 165. In certain embodiments, torch head 110A is configured to deposit weld material in seam 165 at an adjustable, controlled rate. In further embodiments, torch head 110A is configured to remove material from seam 165 prior to the welding process. In certain embodiments, torch 110 is configured to be adjusted by torch adjuster 155 in at least 2 directions—vertically, along the direction of distance A from torch head 110A to workpieces 160 and 170, and horizontally, along the direction of distance B from torch head 110A to seam 165. This disclosure contemplates that torch 110 can be adapted for any type of welding including gas metal arc welding, flux cored arc welding, or gas tungsten arc welding, among others. This disclosure also contemplates that torch 110 can be adapted for any type of gouging including air carbon arc gouging and plasma arc gouging, among others.

In certain embodiments, torch 110 may be moveable with respect to first workpiece 160 and second workpiece 170 along a direction parallel to seam 165. In other embodiments, torch 110 may be relatively fixed along a direction parallel to seam 165, while first workpiece 160 and second workpiece 170 are able to move along this direction during the welding or gouging process. Either embodiment may be desirable depending on the relative size of workpieces 160 and 170 compared to welding tool 120. For example, when welding components of a large piece of equipment, such as a railcar, it is likely easier to move welding tool 120 in order to position torch 110 to weld seam 165, rather than moving the railcar itself.

In certain embodiments, welding tool 120 enables a user to weld or gouge a wide variety of seams 165, including narrow butt seams 165, corresponding to a separation between first workpiece 160 and second workpiece 170 that is too small for traditional automatically guided welders to detect. Welding tool 120 uses an image of seam 165 captured by camera 115 to determine the horizontal location of seam 165; by performing image processor 145, welding tool 120 is able to enhance the image of seam 165 to a level sufficient for detection by welding tool 120. In this manner, welding tool 120 is able to automatically adjust the position of torch 110 to seam 165 to obtain an accurate welding/gouging line without requiring the presence of a human operator in the immediate vicinity of welding tool 120.

Figure 2:
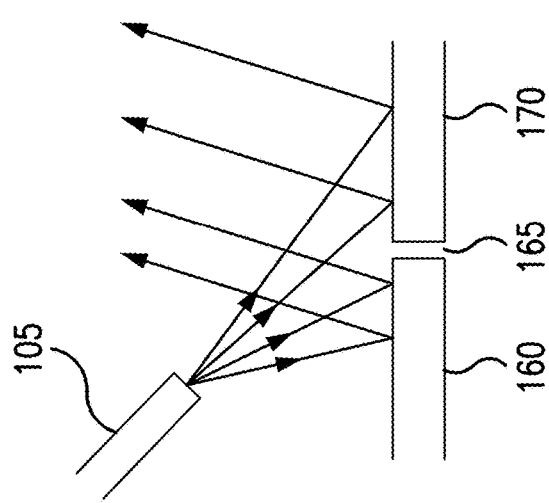
FIG. 2 illustrates the laser line projected onto the seam connecting two workpieces.

FIG. 2 illustrates an example laser beam generated by laser beam source 105 and projected onto first workpiece 160, second workpiece 170, and across seam 165. In certain embodiments, laser beam source 105 produces a laser beam line that is projected onto first workpiece 160, second workpiece 170, and across seam 165. In certain other embodiments, laser beam source 105 produces a spot that laser beam source 105 sweeps across first workpiece 160, second workpiece 170, and seam 165. The reflection of the laser beam generated by laser beam source 105 is used to determine the vertical distance A from torch head 110A to seam 165.

Figure 3C:
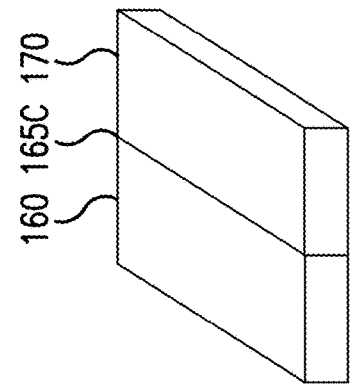
FIGS. 3A, 3B, and 3C illustrate different types of seams.
Figure 3B:
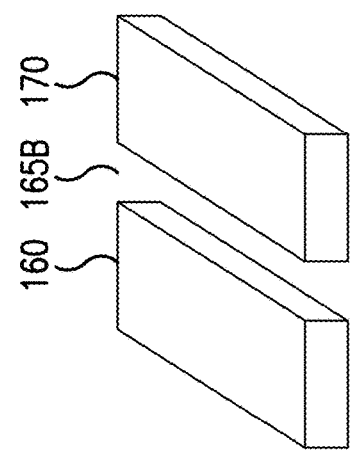
Figure 3A:
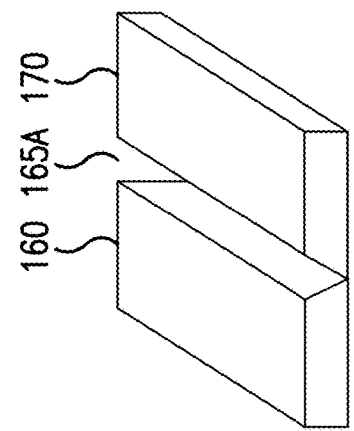

FIGS. 3A-3C illustrate different types of seams that welding tool 120 is capable of automatically welding/gouging. FIG. 3A illustrates a groove type seam 165A between first part 160 and second part 170, FIG. 3B illustrates a large butt seam 165B between first part 160 and second part 170, and FIG. 3C illustrates a tight butt seam 165C between first part 160 and second part 170. Although traditional welders containing laser seam locators are able to weld or gouge seams such as those shown in FIGS. 3A and 3B, they are unable to weld or gouge tight butt seams such as 165C illustrated in FIG. 3C. This is because these traditional welders use the deformation of the reflection of the laser line produced by laser source 105 to determine the horizontal location B of seam 165. When a butt seam such as 165C is too narrow, insufficient deformation will occur, and first workpiece 160 and second workpiece 170 will appear as a continuous, solid workpiece to the traditional automatic laser seam welders. Therefore, in certain embodiments, welding tool 120 is able to accurately weld or gouge a range of different types of seams, including tight butt seams that traditional automatic welders are unable to handle.

Figure 4:
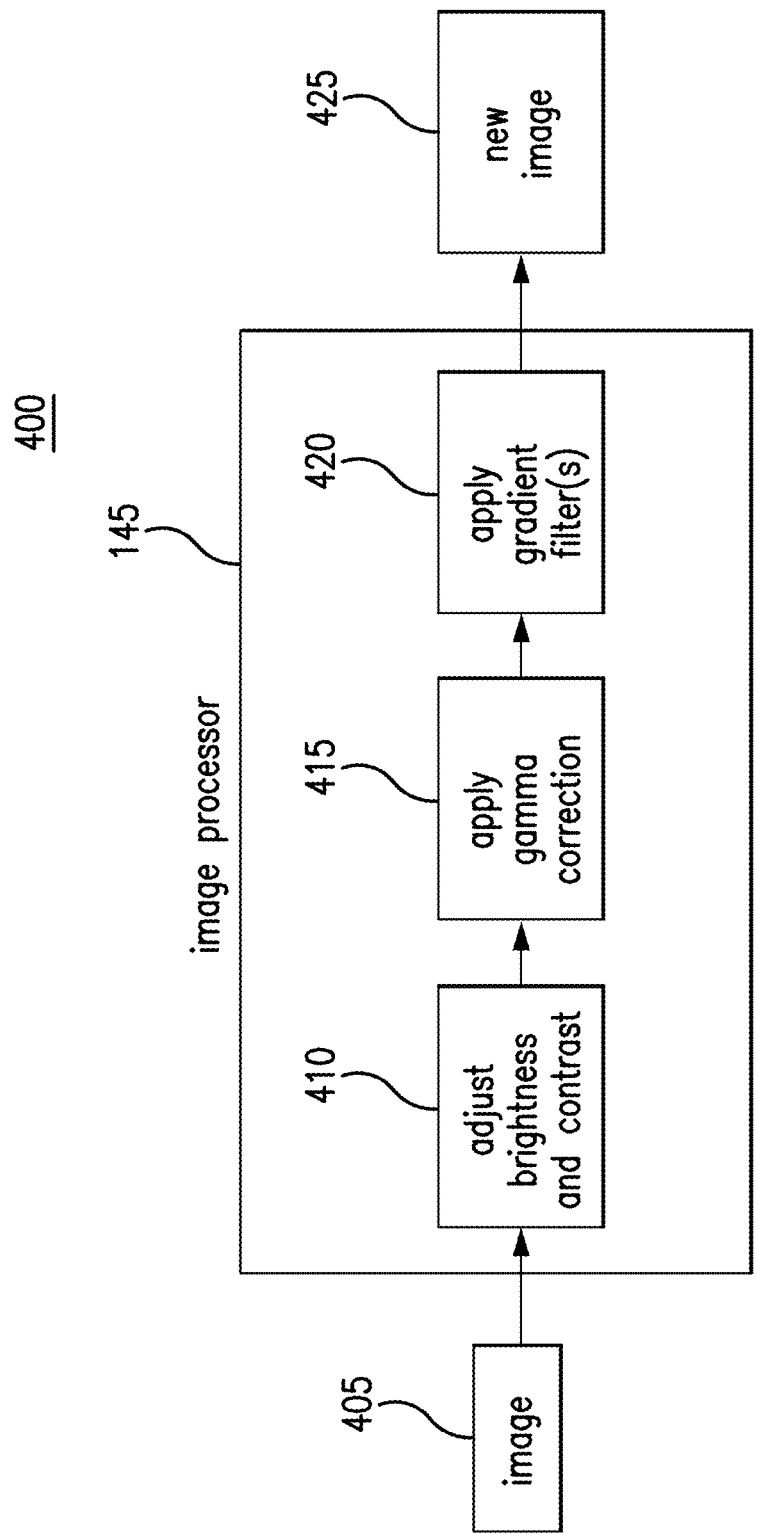
FIG. 4 illustrates the image processor of the welding system of FIG. 1.

FIG. 4 illustrates the image processor 145 of welding system 100. As can be seen, image processor 145 takes as input an image 405 collected by camera 115. In what follows, a gray-scale image is considered, for simplicity. The gray-scale image will be assumed to contain pixels with intensity values ranging from 0 to 1, where a value of 0 represents black, and a value of 1 represents white. However, this disclosure contemplates that any range of values can be used for the intensity range. Additionally, this disclosure contemplates that camera 115 could also collect a color image 405 rather than a gray-scale image 405.

Image 405 includes a collection of pixels covering the x-y plane, each labeled with an intensity value, where the x-y plane corresponds to the plane of first workpiece 160 and second workpiece 170, and seam 165 is generally located along the y direction. Image processor 145 first adjusts the brightness and contrast of image 405 in step 410 using a brightness value 135A and a contrast value 135B stored in memory 130. Adjusting the brightness includes adding a constant value, the brightness value 135A, to the intensity of each of the individual pixels, thereby uniformly increasing/decreasing the average intensity of the pixels. This disclosure contemplates that the brightness value 135A can take any value. In certain embodiments, for example, the brightness value 135A is zero, and the brightness of image 405 is thus left unaltered. Adjusting the contrast includes multiplying the intensity of each of the individual pixels by a constant value, the contrast value 135B, thereby increasing the difference between the maximum and minimum intensity values in image 405. This disclosure contemplates that the contrast value 135B can take any value. In certain embodiments, for example, the contrast value 135B is one, and the contrast of image 405 is thus left unaltered. In step 415, image processor 405 applies a gamma correction 135C to image 405. Applying gamma correction 135C includes raising the intensity of each pixel of image 405 to an exponent, where the exponent is the gamma correction 135C. A gamma correction 135C greater than one has the effect of expanding the high-intensity information in image 405, while suppressing low-intensity information. This disclosure contemplates that gamma correction 135C can take any value. In certain embodiments, for example, gamma correction 135C is one, and applying gamma correction 135C to image 405 leaves image 405 unchanged. This disclosure contemplates that the brightness value 135A, contrast value 135B, and gamma correction 135C are chosen so as to increase the intensity and contrast of the pixels in image 405 corresponding to seam 165, compared to the background. In certain embodiments the values chosen are adjustable to take into account the lighting conditions of the environment in which welding tool 120 is operated.

Next, at step 420, image processor 145 applies at least one gradient filter 140 to image 405 to accentuate the bright edge in image 405 that corresponds to seam 165. The result is stored in new image 425. The process 420 of applying gradient filter 140 includes replacing the value of each pixel in image 405 with a new value based on the original value of the pixel and the values of the neighboring pixels, each weighted by coefficients provided by gradient filter 140. Because, as discussed above, this disclosure contemplates that an x-y coordinate system can be chosen in which seam 165 is generally located along the y-axis, when travelling from left to right along the x-direction, the intensity of the pixels increases at the location of seam 165 in image 405. Thus, gradient filters 140 are chosen which accentuate a west edge of a bright region in image 405.

FIG. 5 provides examples of three potential gradient filters, each of which is used to highlight or extract a bright west edge in image 405. A given filter is applied to each pixel in image 405, by placing the center of the filter on the pixel and determining a new value for the pixel by first multiplying the value of each pixel from the set of pixels covered by the filter by the corresponding coefficient provided by the filter and then summing the resulting values. For example, when using gradient filter 515, the value of a given pixel is replaced by the sum of the values of its northeasternmost neighbor, its easternmost neighbor, and its most southeastern neighbor, minus the sum of the values of its northwestern most neighbor, its westernmost neighbor, and its most southwestern neighbor. This process is repeated for each pixel in image 405, with the result stored in new image 425. As can be seen in FIG. 5, the central value in gradient filter 510 is one. Applying this filter to image 405 therefore has the effect of producing new image 425 in which the highlighted bright west edge is superimposed on the original image 405. In contrast, gradient filters 505 and 515 both have zero as their central values. Therefore, applying these filters to image 405 to produce new image 425 has the effect of simply extracting the bright west edge of image 405. This disclosure contemplates that any number, one or more, of gradient filters may be applied to image 405 to create new image 425. For example, in certain embodiments, filter 505 is applied to image 405 to create new image 425. In further embodiments, filter 510, followed by filter 515 is applied to image 405 to create new image 425. Because these filters act to accentuate the western edges of bright regions in image 405, they have the effect of highlighting seam 165, thereby increasing the intensity of seam 165 in new image 425 as compared to the original image 405.

Figure 6A:
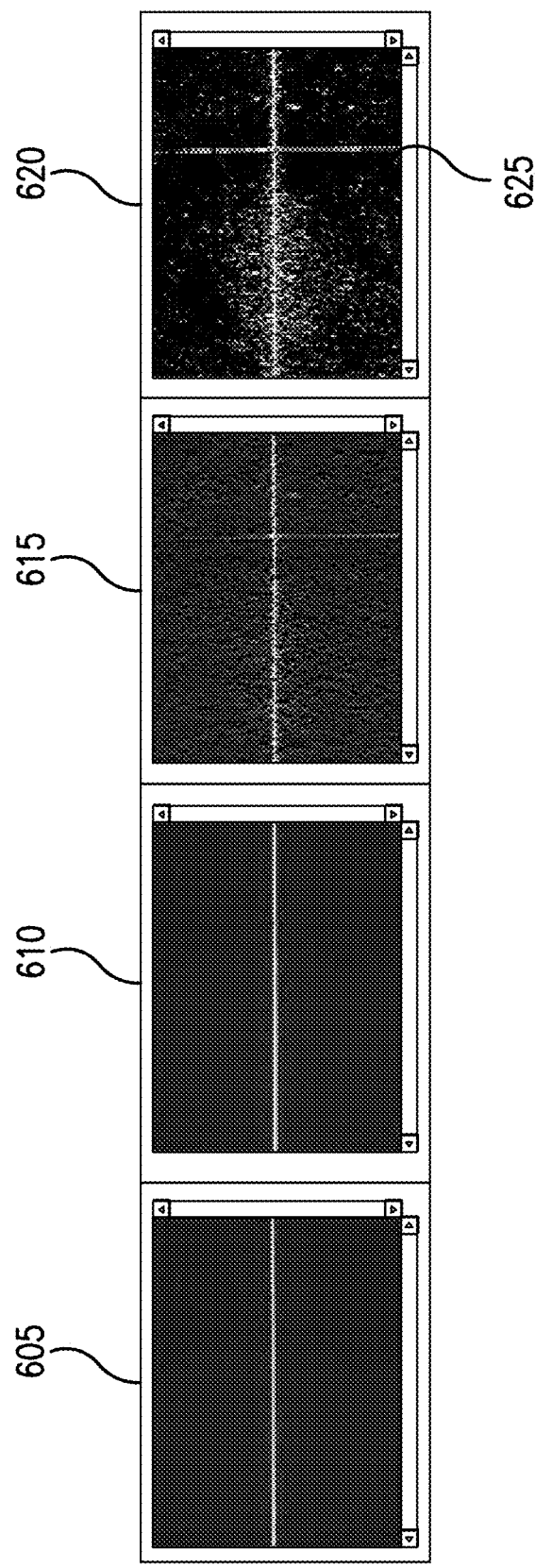
FIGS. 6A and 6B present example images at various stages of the image processing process of the welding system of FIG. 1.
Figure 6B:
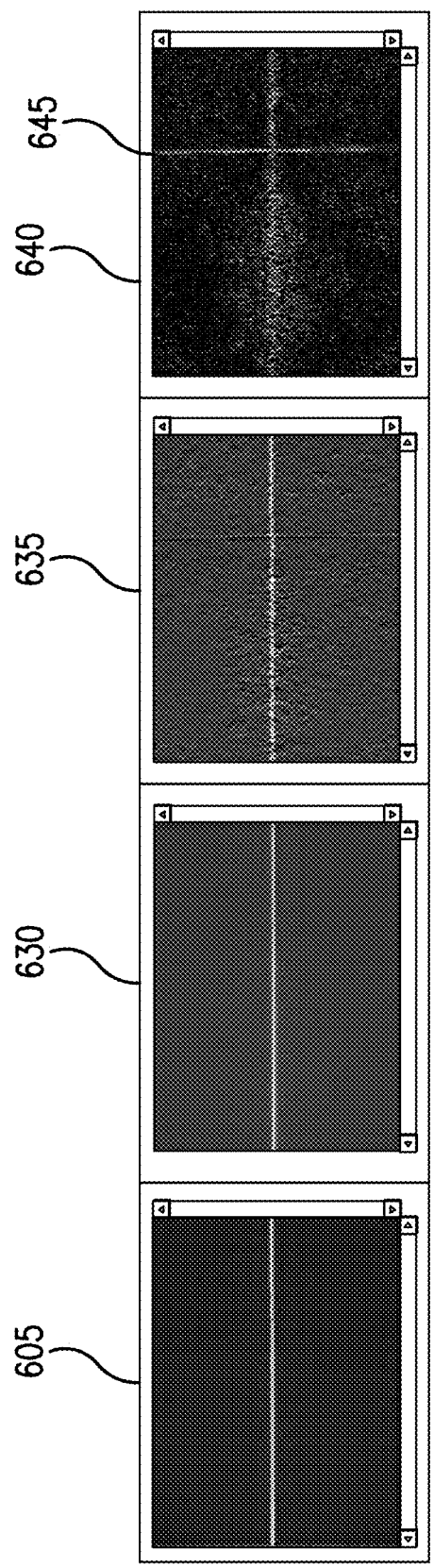

FIGS. 6A and 6B present examples illustrating the effect of adjusting the brightness and contrast of image 405, applying gamma correction 135C to image 405, and applying the one or more gradient filters 140 to image 405 to produce new image 425. In FIG. 6A, image 605 corresponds to original image 405 captured by camera 115. In image 610, the brightness and contrast of image 605 have been adjusted and a gamma correction has been applied. Image 615 corresponds to new image 425, produced by applying gradient filter 505 to image 610. As will be discussed in further detail below, in the discussion of FIG. 7, image 620 is formed by converting image 615 to a binary image. As can be seen, while not originally visible in image 605, this process has the effect of enhancing seam 165 such that it is visible at x-location 625. Similarly, in FIG. 6B, image 605 corresponds to original image 405 captured by camera 115. In image 630, the brightness and contrast of image 605 have been adjusted and a gamma correction has been applied. Image 635 corresponds to a first new image 425, produced by applying a first gradient filter 510 to image 630. Finally, image 640 corresponds to a second new image 425, produced by applying a second gradient filter 515 to image 635. As can be seen, while not originally visible in image 605, this process also has the effect of enhancing seam 165 such that it is visible at x-location 645. Once image processor 145 has enhanced seam 165, seam locator 150 is used to automatically determine the horizontal location (x-location) of seam 165, as described below in the discussion of FIG. 7.

Figure 7:
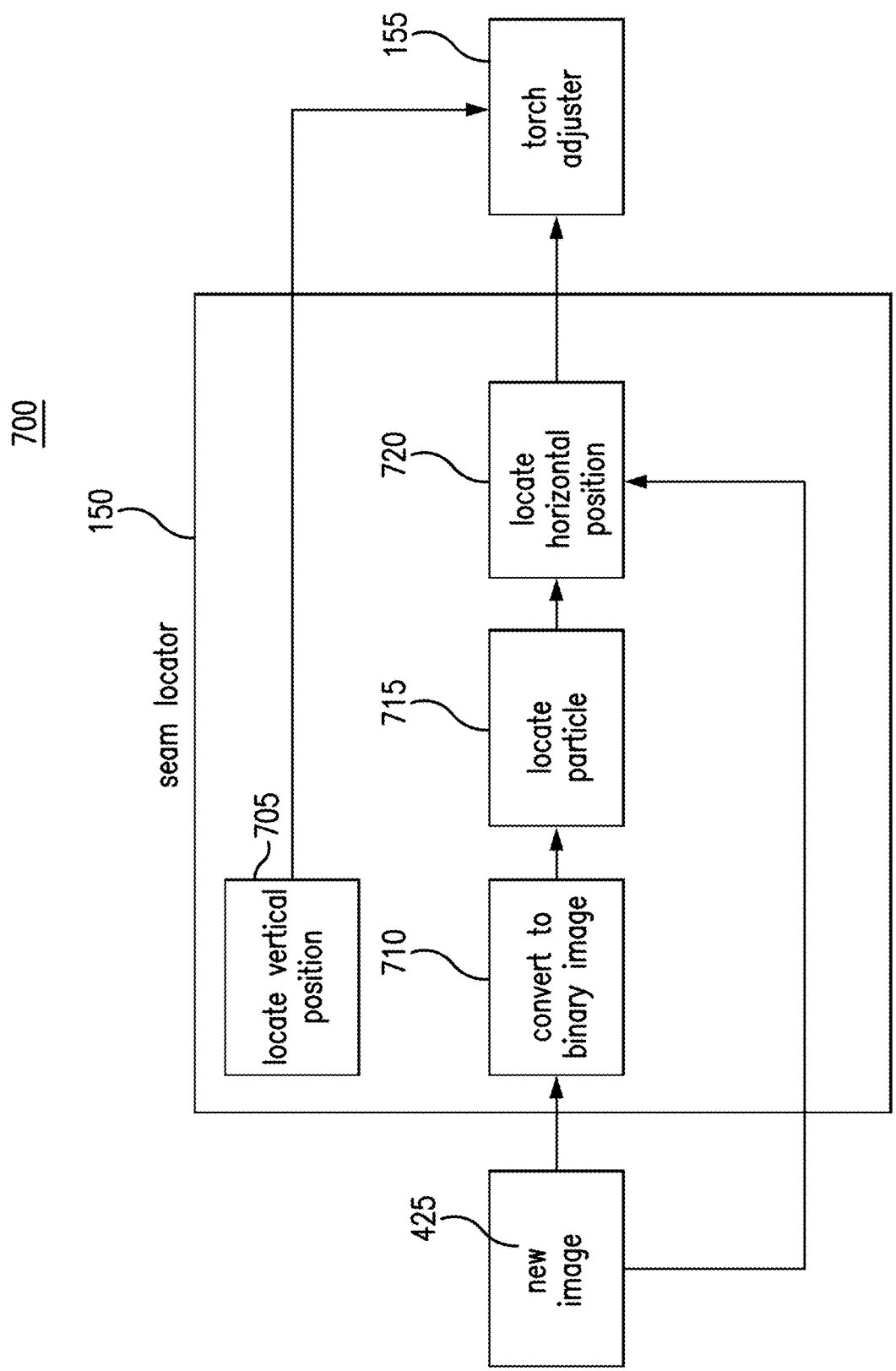
FIG. 7 illustrates the steps involved in the seam locator of the welding system of FIG. 1.

FIG. 7 illustrates the steps executed by seam locator 150 of system 100. At step 705, seam locator 150 determines the vertical distance A from torch head 110A to seam 165, based on the reflection of the laser beam produced by laser beam source 105 on the surface defined by first workpiece 160, second workpiece 170, and seam 165. For example, since the laser beam is projected at the surface at a known angle, the fact that the angle of incidence to the surface is equal to the angle of reflection from the surface, along with a measurement of the deviation of the position of the image of the laser reflection captured by camera 115 compared to a known baseline can, in certain embodiments, be used to determine the distance from the laser to the surface. This, in turn, can be used to determine the distance A from torch head 110A to seam 165.

In certain embodiments, further manipulation of new image 425 is performed, prior to determining the distance B from torch head 110A to seam 165. For example, in particular embodiments, at step 710, new image 425 is converted to a binary image. Converting new image 425 to a binary image can be accomplished in several ways. For example, in certain embodiments a threshold value is set manually by a user of system 100, such that pixels in image 425 with intensity values below the threshold value are set to zero, while pixels in image 425 with intensity values above the threshold value are set to one. In further embodiments, a threshold value is determined automatically by seam locator 150. For example, seam locator 150 places the values of the pixels in image 425 into a histogram and uses the histogram to determine an appropriate threshold value. The method of determining the appropriate threshold value may include one of several known techniques, such as Otsu's method, for example. In Otsu's method, the image is assumed to include two classes of pixels (foreground pixels and background pixels) following a bi-modal distribution. The optimal threshold value is then determined to be the intensity value that separates the two classes of pixels, such that the variation within the classes is minimized.

Once new image 425 is converted to a binary image in step 710, in certain embodiments, seam locator 150 uses the binary image to locate particles in the image, at step 715. Here, non-zero pixels are considered to be part of the same particle when they touch. In certain embodiments, pixels are considered to be part of the same particle only when they touch along an adjacent edge. In further embodiments, pixels are considered to be part of the same particle even when they touch only at a corner. The latter may be desirable when, for example, a seam 165 is extremely narrow and segments of seam 165 are located at an angle to the y-axis. In certain embodiments, an identification of the particles in the binary image may result in the location of an approximately cross-shaped particle including the laser beam line, directed generally along the x-direction and the seam, directed generally along the y-direction. The location of the lowest y-position of this particle, or the point where this particle touches the bottom edge of the image, may be provided as a starting point for a line detection algorithm used to determine the location of seam 165.

At step 720, seam locator 150 determines the horizontal distance B from torch head 110A to seam 165. In certain embodiments, this is accomplished by operating a conventional line detection algorithm directly on new image 425, produced by image processor 145, to determine the horizontal location (x-component) of seam 165. In further embodiments, this is accomplished by operating a conventional line detection algorithm on the binary image produced in step 710. In particular embodiments, particle location information generated at step 715 is provided, as a starting point, to the line detection algorithm.

Once seam locator 150 has determined the vertical distance A from torch head 110A to seam 165 and the horizontal distance B from torch head 110A to seam 165, torch adjuster 155 is used to position torch head 110A to make the weld. In certain embodiments, torch head 110A is configured to deposit weld material in seam 165 at an adjustable, controlled rate. In further embodiments, torch head 110A is configured to remove material from seam 165 prior to the welding process. In both instances, the vertical and horizontal positions of torch head 110A, at each point along seam 165, are determined as described above.

In certain embodiments, torch 110 may be moveable with respect to first workpiece 160 and second workpiece 170 along a direction parallel to seam 165. In other embodiments, torch 110 may be relatively fixed along a direction parallel to seam 165, while first workpiece 160 and second workpiece 170 are able to move along this direction during the welding or gouging process. Either embodiment may be desirable depending on the relative size of workpieces 160 and 170 compared to welding tool 120. For example, when welding or gouging components of a large piece of equipment, such as a railcar, it is likely easier to move welding tool 120 in order to position torch 110 to weld or gouge seam 165, rather than moving the railcar itself.

Figure 8:
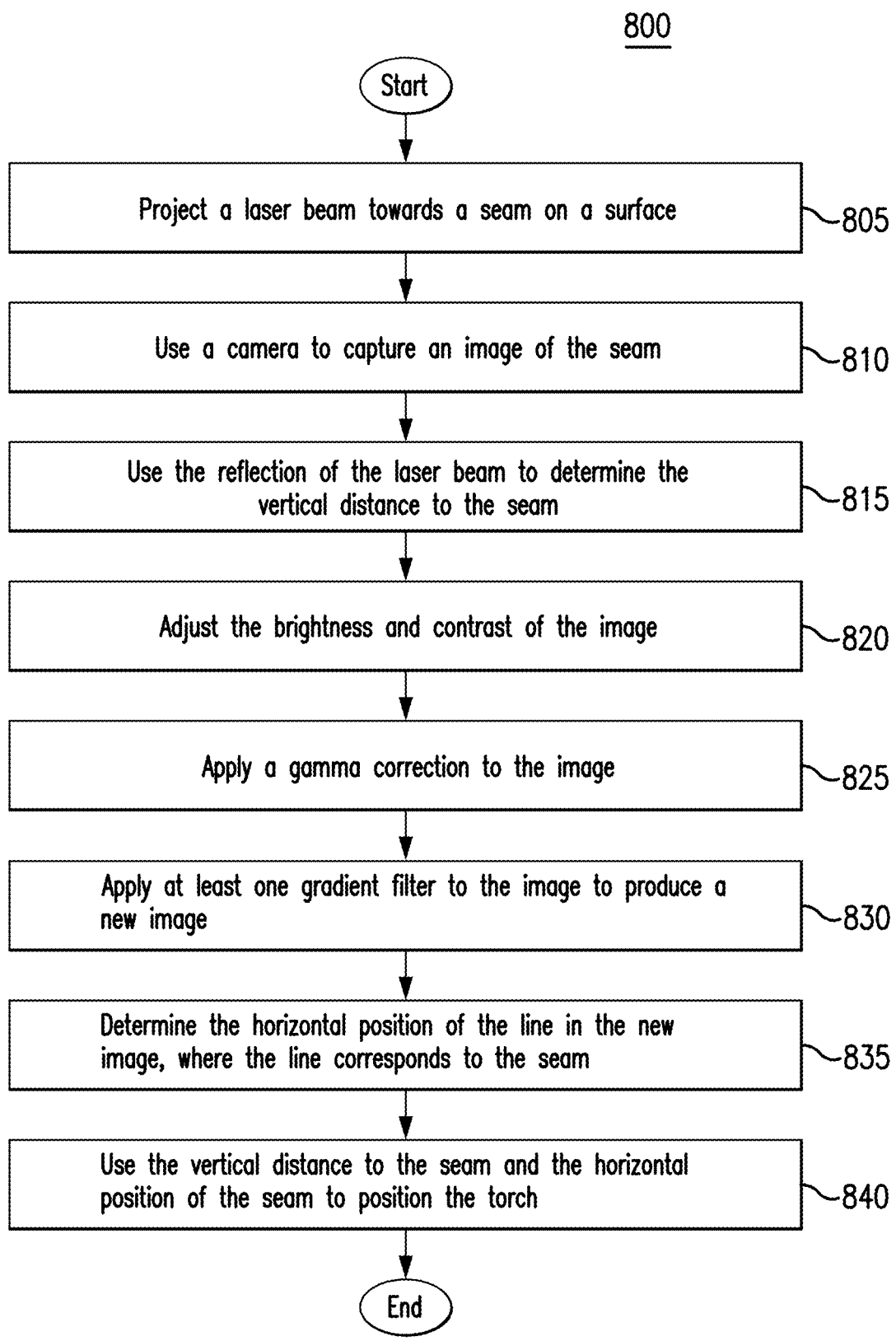
FIG. 8 presents a flowchart illustrating the process by which the welder in the welding system of FIG. 1 determines the vertical and horizontal locations of the seam to weld.

FIG. 8 illustrates the process by which welding tool 120 automatically determines the vertical and horizontal positions for welding torch head 110A in order to weld or gouge seam 165 between a first workpiece 160 and a second workpiece 170. In step 805, welding tool 120 projects a laser beam from laser beam source 105 towards seam 165 on a surface including first workpiece 160 and second workpiece 170. In step 810, welding tool 120 uses camera 115 to capture an image of seam 165. Then in step 815, welding tool 120 uses the reflection of the laser beam generated by laser beam source 105 to determine the vertical distance A from torch head 110A to seam 165. In steps 820 through 830, welding tool 120 applies image processor 145 to the image. This includes first adjusting the brightness and contrast of the image in step 820 and then applying a gamma correction to the image in step 825. In step 830, image processor 145 applies at least one gradient filter to the image to produce a new image in which seam 165 is accentuated. Welding tool 120 then uses this new image, in step 835, to determine the horizontal position of the line in the new image, where the line in the new image corresponds to seam 165. Finally, in step 840, welding tool 120 uses the vertical distance A between torch head 110A and seam 165 and the horizontal distance between B between torch head 110A and seam 165 (determined from the horizontal position of the seam in new image 425) to position torch 110 such that welding or gouging of seam 165 can occur.

Modifications, additions, or omissions may be made to method 800 depicted in FIG. 8. Method 800 may include more, fewer, or other steps. For example, steps may be performed in parallel or in any suitable order.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. An apparatus comprising:
   a welding torch comprising a torch head;
   a laser beam source configured to project a laser beam generally towards a seam on a surface;
   a camera directed towards the surface and configured to capture an image comprising the surface and a reflection of the laser beam from the surface;
   a memory configured to store:
      a gamma correction;
      a brightness value;
      a contrast value; and
      at least one gradient filter; and
   a hardware processor communicatively coupled to the memory and the camera, the hardware processor configured to:
      receive the image from the camera;
      determine, based on the reflection of the laser beam from the surface, a vertical distance from the torch head to the seam;
      adjust a brightness of the image, based on the brightness value;
      adjust a contrast of the image, based on the contrast value;
      apply the gamma correction to the image;
      apply the at least one gradient filter to the image to produce a new image;
      determine a horizontal location of a line in the new image, the line in the new image corresponding to the seam;
      determine, based on the horizontal location of the line in the new image, a horizontal distance from the torch head to the seam;
      adjust a vertical position of the torch head, based on the vertical distance from the torch head to the seam; and
      adjust a horizontal position of the torch head, based on the horizontal distance from the torch head to the seam.

2. The apparatus of claim 1, wherein the at least one gradient filter comprises a first filter used to extract a west edge in the image.

3. The apparatus of claim 1, wherein the at least one gradient filter comprises:
   a first filter used to highlight a west edge in the image; and
   a second filter used to extract the west edge in the image.

4. The apparatus of claim 1, wherein in response to applying the at least one gradient filter to the image to produce the new image, the processor is further configured to convert the new image to a binary image.

5. The apparatus of claim 4, wherein converting the new image to the binary image comprises using a fixed threshold value.

6. The apparatus of claim 4, wherein converting the new image to the binary image comprises using a histogram of pixel intensity values to determine a threshold value.

7. The apparatus of claim 4, wherein in response to converting the new image to the binary image, the processor is further configured to locate at least one binary particle in the binary image, and the process of determining the horizontal location of the line in the new image comprises using the at least one binary particle.

8. A method comprising:
   receiving an image from a camera, the image comprising a surface and a reflection of a laser beam directed generally towards a seam on the surface;
   determining, based on the reflection of the laser beam from the surface, a vertical distance from a welding torch head to the seam;
   adjusting a brightness of the image;
   adjusting a contrast of the image;
   applying a gamma correction to the image;
   applying at least one gradient filter to the image to produce a new image;
   determining a horizontal location of a line in the new image, the line in the new image corresponding to the seam;
   determining, based on the horizontal location of the line in the new image, a horizontal distance from the welding torch head to the seam;
   adjusting a vertical position of the welding torch head based on the vertical distance from the welding torch head to the seam; and
   adjusting a horizontal position of the welding torch head based on the horizontal distance from the welding torch head to the seam.

9. The method of claim 8, wherein the at least one gradient filter comprises a first filter used to extract a west edge in the image.

10. The method of claim 8, wherein the at least one gradient filter comprises:
    a first filter used to highlight a west edge in the image; and
    a second filter used to extract the west edge in the image.

11. The method of claim 8, further comprising in response to applying the at least one gradient filter to the image to produce the new image, converting the new image to a binary image.

12. The method of claim 11, wherein converting the new image to the binary image comprises using a fixed threshold value.

13. The method of claim 11, wherein converting the image to the binary image comprises using a histogram of pixel intensity values to determine a threshold value.

14. The method of claim 11, further comprising in response to converting the new image to the binary image, locating at least one binary particle in the binary image, and using the at least one binary particle in determining the horizontal location of the line in the new image.

15. A system comprising:
a welding torch comprising a torch head;
a laser beam source configured to project a laser beam generally towards a seam on a surface;
a camera directed towards the surface and configured to capture an image comprising the surface and a reflection of the laser beam from the surface;
a storage element operable to store:
    a gamma correction;
    a brightness value;
    a contrast value; and
    at least one gradient filter, comprising a first filter used to extract a west edge in the image; and
a processing element communicatively coupled to the storage element and the camera and operable to:
    receive the image from the camera;
    determine, based on the reflection of the laser beam from the surface, a vertical distance from the torch head to the seam;
    adjust a brightness of the image, based on the brightness value;
    adjust a contrast of the image, based on the contrast value;
    apply the gamma correction to the image;
    apply the at least one gradient filter to the image to produce a new image;
    determine a horizontal location of a line in the new image, the line in the new image corresponding to the seam;
    determine, based on the horizontal location of the line in the new image, a horizontal distance from the torch head to the seam;
    adjust a vertical position of the torch head, based on the vertical distance from the torch head to the seam; and
    adjust a horizontal position of the torch head, based on the horizontal distance from the torch head to the seam.

16. The system of claim 15, wherein the at least one gradient filter comprises:
    a first filter used to highlight a west edge in the image; and
    a second filter used to extract the west edge in the image.

17. The system of claim 15, wherein in response to applying the at least one gradient filter to the image to produce the new image, the processing element is further operable to convert the new image to a binary image.

18. The system of claim 17, wherein converting the new image to the binary image comprises using a fixed threshold value.

19. The system of claim 17, wherein converting the new image to the binary image comprises using a histogram of pixel intensity values to determine a threshold value.

20. The system of claim 17, wherein in response to converting the new image to the binary image, the processing element is further operable to locate at least one binary particle in the binary image, and the process of determining the horizontal location of the line in the new image comprises using the at least one binary particle.

* * * * *